(12) United States Patent
Kraus

(10) Patent No.: US 8,807,330 B2
(45) Date of Patent: Aug. 19, 2014

(54) DEVICE AND METHOD FOR TRANSPORTING CONTAINERS

(75) Inventor: Andreas Kraus, Regensburg (DE)

(73) Assignee: Krones AG (DE)

( * ) Notice: Subject to any disclaimer, the term of this patent is extended or adjusted under 35 U.S.C. 154(b) by 0 days.

(21) Appl. No.: 13/463,658

(22) Filed: May 3, 2012

(65) Prior Publication Data

US 2012/0285800 A1    Nov. 15, 2012

(30) Foreign Application Priority Data

May 11, 2011  (DE) .......................... 10 2011 101 255

(51) Int. Cl.
*B65G 37/00*   (2006.01)
*B65G 47/86*   (2006.01)

(52) U.S. Cl.
CPC ...... *B65G 47/847* (2013.01); *B65G 2201/0247* (2013.01)
USPC ..................................... 198/803.9; 198/478.1

(58) Field of Classification Search
USPC ...................................................... 198/803.9
See application file for complete search history.

(56) References Cited

U.S. PATENT DOCUMENTS

| | | | | |
|---|---|---|---|---|
| 5,232,717 | A | | 8/1993 | Voss ................................ 425/534 |
| 5,357,392 | A | * | 10/1994 | Guyomard et al. .............. 361/23 |
| 5,863,571 | A | * | 1/1999 | Santais et al. ................... 425/526 |
| 6,779,651 | B1 | * | 8/2004 | Linglet et al. .............. 198/803.9 |
| 7,798,758 | B2 | * | 9/2010 | Bufano et al. ........... 414/222.01 |
| 8,604,779 | B2 | * | 12/2013 | Strothmann ............. 324/207.25 |
| 2009/0000909 | A1 | * | 1/2009 | Hollriegl et al. ......... 198/377.03 |
| 2009/0159152 | A1 | * | 6/2009 | Till ................................ 141/145 |
| 2009/0231368 | A1 | * | 9/2009 | Nakano et al. ..................... 347/8 |

FOREIGN PATENT DOCUMENTS

| | | | |
|---|---|---|---|
| DE | 19654350 | 6/1998 | ............. B29C 49/42 |
| DE | 102006023531 | 11/2007 | ............. B65G 47/52 |
| DE | 202008014089 | 2/2009 | ............. B65G 47/86 |
| EP | 2100815 | 9/2009 | ................ B65C 9/04 |
| WO | WO9626826 | 9/1996 | ............. B29C 49/42 |
| WO | WO2009144664 | 12/2009 | ............. B29C 49/12 |

OTHER PUBLICATIONS

Search Report issued in corresponding application No. 12166168.0, dated Aug. 20, 2012 (7 pgs).

* cited by examiner

*Primary Examiner* — Gene Crawford
*Assistant Examiner* — Lester Rushin
(74) *Attorney, Agent, or Firm* — Hayes Soloway P.C.

(57) ABSTRACT

A device for transporting containers and in particular plastic containers has a main carrier rotatable about a pre-specified main axis D, with a multiplicity of transport elements for transporting the plastic containers. Each of the transport elements is arranged on an arm and can swivel in relation to the main carrier about a pre-specified geometric pivot axis. A multiplicity of independently controllable first drives is provided to generate the swivel movements of the transport elements. Each transport element is also mobile linear in relation to the pivot axis about which it is pivotable, and a multiplicity of independently controllable second drives is provided to generate the linear movement of the transport elements.

15 Claims, 10 Drawing Sheets

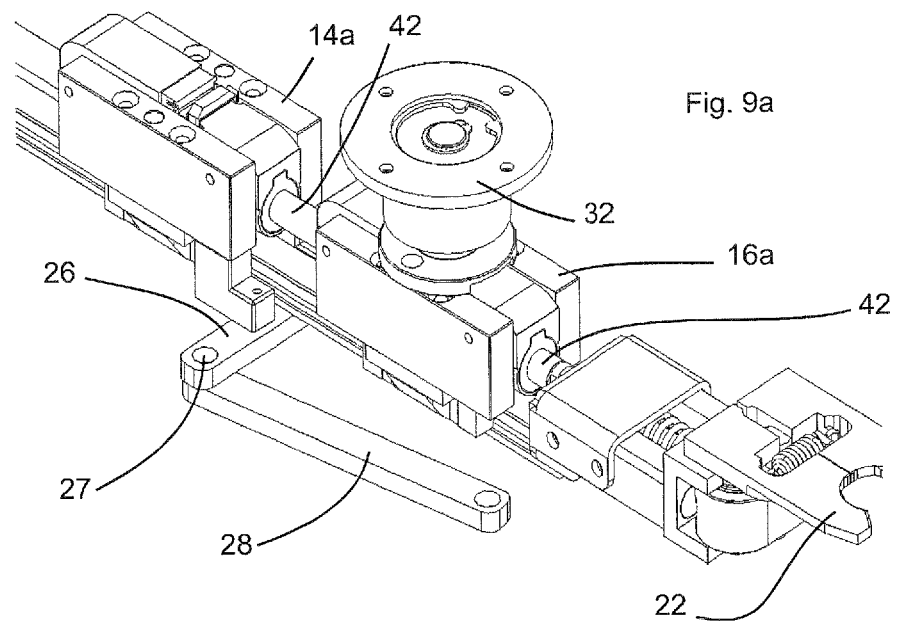
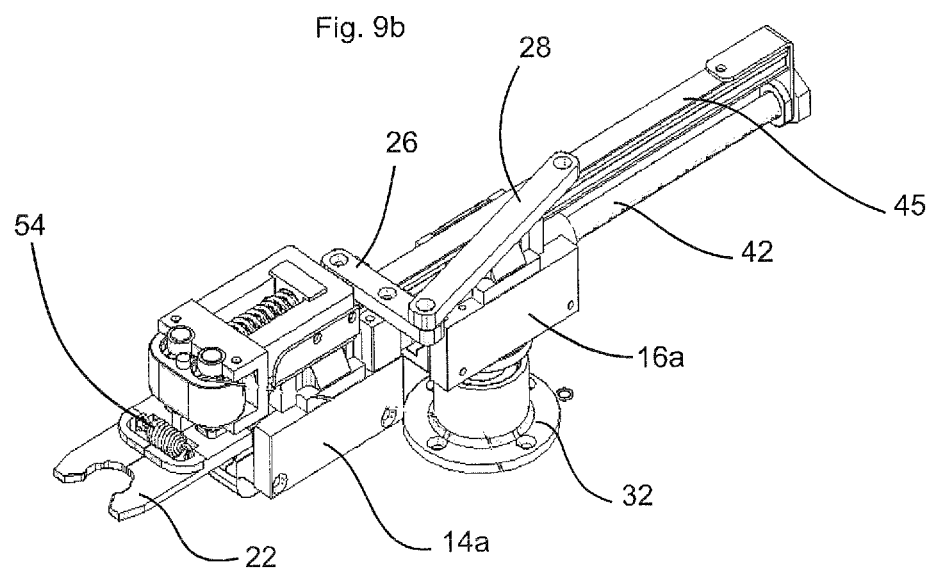

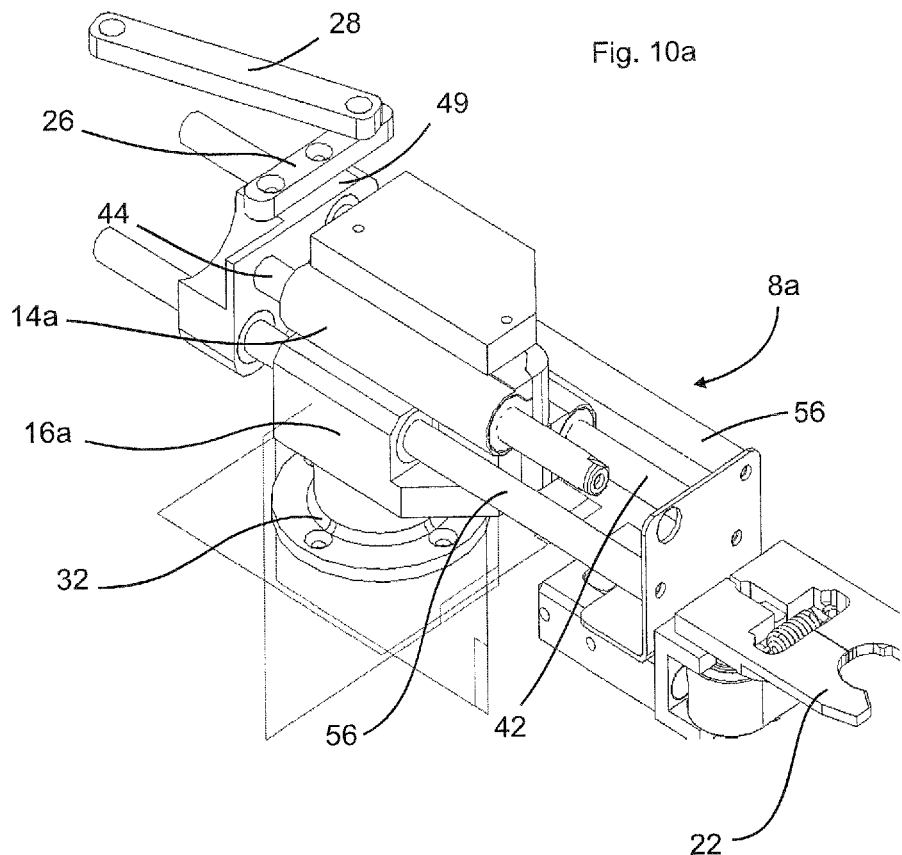
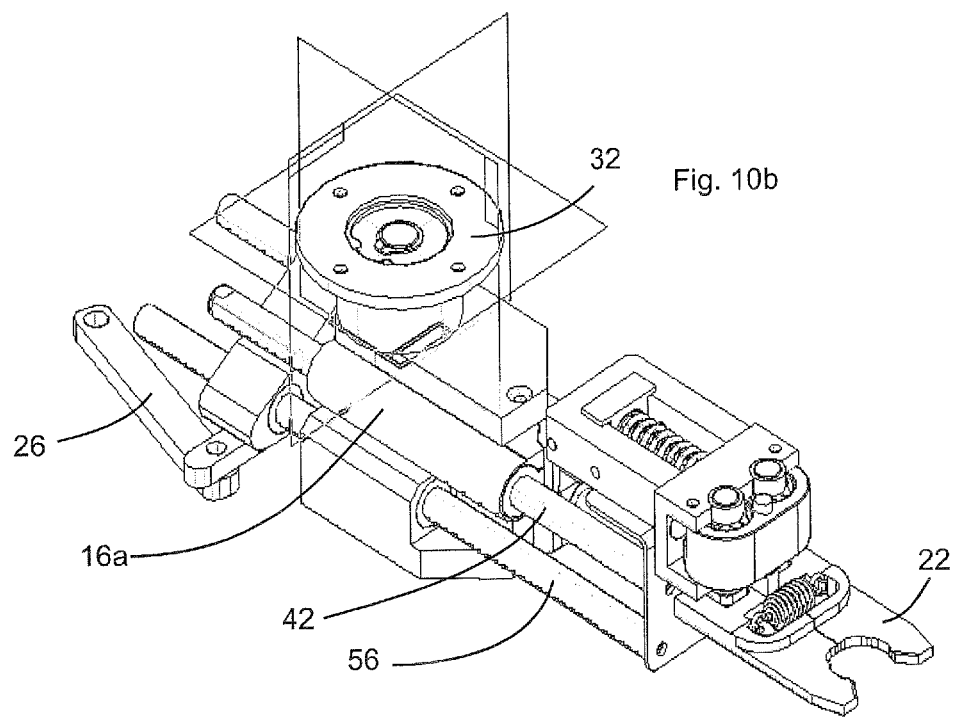

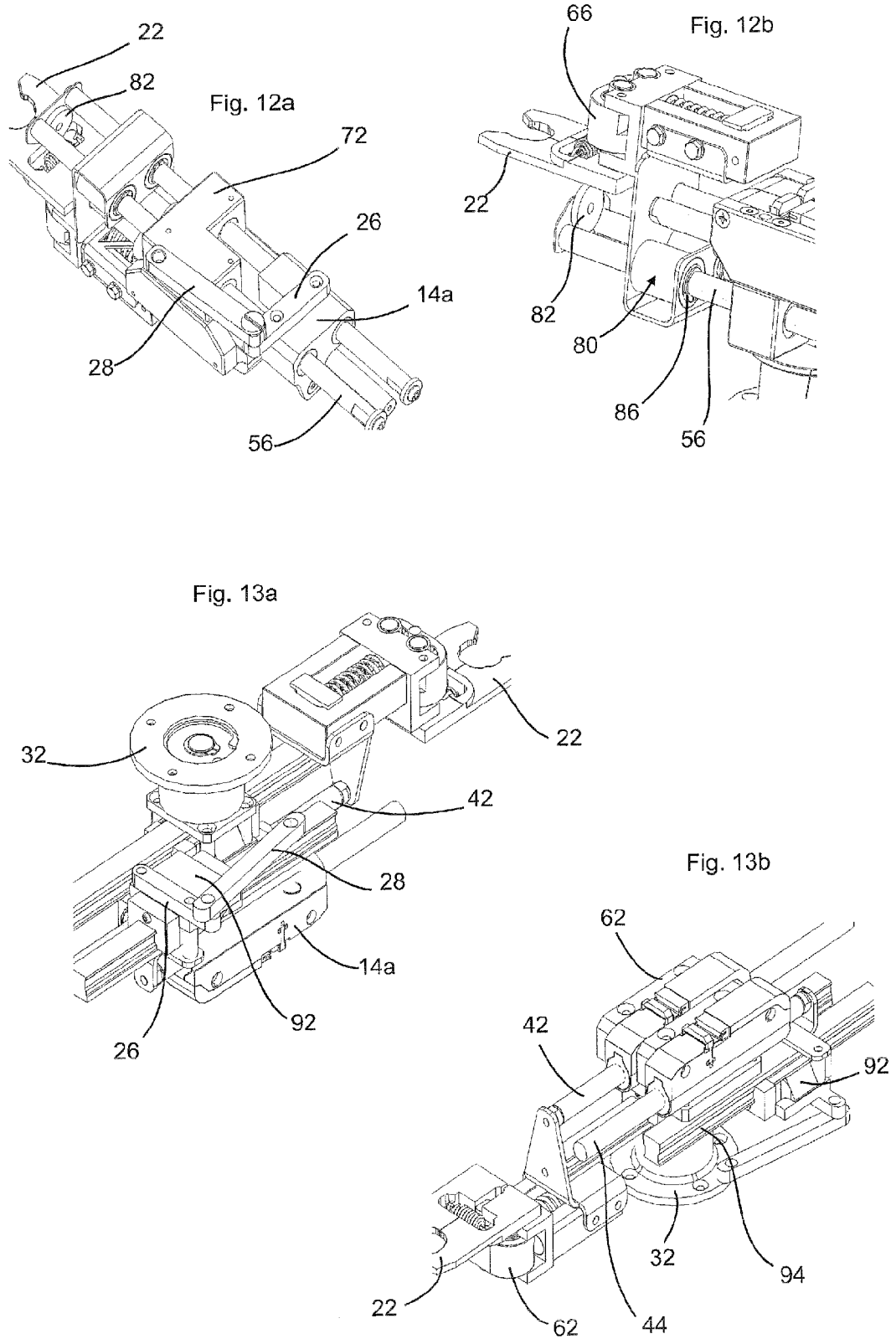

DEVICE AND METHOD FOR TRANSPORTING CONTAINERS

BACKGROUND OF THE INVENTION

The present invention relates to a device and a method for transporting containers and in particular drinks containers. Such devices are known for example in the form of transport belts or transport stars. Such transport stars normally have a multiplicity of gripper elements which can grip the containers for example below their carrier ring and transport them from a first processing unit to a further processing unit. For certain requirements in the field of the drinks production industry however it is necessary to change the pitch between the individual containers and on the path from one treatment plant to a further treatment plant. To this end for example so-called pitch-change stars are used. DE 10 2006 023 531 discloses a device for transporting unit goods. Here a transport star is provided, on the individual arms of which are mounted in turn swivelable or rotatable extensions with gripper elements for the containers. In this way the containers can be transported not only in relation to a rotary axis about which the transport star is rotatably mounted, but also in relation to further pivot axes.

WO 2009/144664 A2 also discloses a system for production of plastic containers and in particular plastic bottles. Here a feed star is provided which supplies plastic preforms to a blow-moulding machine, wherein this feed star has a multiplicity of arms pivotable on the carrier star, wherein the individual gripper elements are again pivotable in relation to these arms. This pivotability in relation to two different axes already allows greater degrees of freedom in transporting containers. However such drives with double pivot joints are comparatively complex both to program and to produce.

SUMMARY OF THE INVENTION

The present invention is therefore based on the object of providing a device and a method which simplifies the transport of plastic containers in particular between several processing plants.

A device according to the invention for transporting containers and in particular plastic containers has a main carrier rotatable about a pre-specified main axis and a multiplicity of transport elements for transporting the containers, wherein each of these transport elements is arranged on an extension arm and can pivot in relation to the main carrier about a pre-specified geometric pivot axis. Furthermore a multiplicity of independently controllable first drives is provided to generate the swivel movements of the transport elements in relation to the main carrier or in relation to said pivot axes.

According to the invention, each transport element is also linearly mobile in relation to the pivot axes about which it can swivel, and a multiplicity of independently controllable second drives is provided to generate the linear movements of the transport elements.

The transport elements can for example be gripper elements which hold the containers for example on a carrier ring in order to transport them. The containers are in particular plastic bottles, however the containers can also be plastic preforms or for example glass bottles.

Preferably these gripper elements are passive gripper elements and particularly preferably spring-loaded gripper elements. It would however also be conceivable for the gripper elements to be active i.e. for example to be able to be transferred by a further drive from a closed position into an open position and vice versa.

In contrast to the described prior art, it is therefore proposed that the transport elements are mobile linear along a straight line and also swivellable about their respective pivot axes. This combined linear and swivel movement substantially increases the freedom of movement of the individual gripper elements in comparison with the prior art.

As stated above, in container handling different pitches in the individual plant parts may be required. According to the invention to compensate for these different pitches a shift and swivel movement is proposed. In this way different pitches can be applied and the delivery of containers for example can also be "accompanied" i.e. adapted to the movement of a subsequent processing assembly. As well as the point delivery known in the prior art, the containers can be accompanied on their delivery whereby acceleration forces acting on the containers can be reduced. Thus advantageously this linear movement takes place without the involvement of mechanical gears, spindles or belts and is therefore particularly wear-free.

In a further advantageous embodiment the first and second drives allocated to a transport element can be controlled independently of each other. This means that the swivel movement of the gripper element and the movement along the linear direction are independent of each other and in this way a high number of arbitrary positions for the gripper elements can be accessed.

Advantageously the first drives are electric motor drives and particularly preferably linear motors.

In a further advantageous embodiment the second drives are also electric motor drives and in particular linear motors.

Thus it is possible for the individual motors or drive units to be composed of merely two parts, namely a rotor and a stator. The rotor can advantageously comprise or contain neodymium magnets which in a further advantageous embodiment are accommodated for example in a stainless steel tube. The motor windings can be housed in the stators, together with the bearings for the rotors and further components such as for example a position detector and also a microprocessor circuit for monitoring the motor.

In a further advantageous embodiment, both drives are linear drives or linear motors which have a common rotor or a common stator. Thus it is possible for example that the said linear stroke is achieved via a linear drive which for example takes place electromagnetically. For a second drive a rotary movement is generated via a linear stroke, advantageously with connected lever kinematics. Thus it is possible for a common rotor rod to function for both drives.

In a further advantageous embodiment at least one first drive has a linearly mobile drive element, the linear movement of which (in particular by means of a mechanical coupling device) is transformed into the swivel movement of the transport element in relation to the respective pivot axis. This transformation of the linear movement and swivel movement is explained in more detail with reference to the figures.

One element of the coupling device can be arranged at a fixed angle in relation to the abovementioned extension arm. In a further advantageous embodiment the coupling device is hinged on a carrier or on a component fixed rotationally in relation to the carrier. Thus for example an additional carrier plate can be provided on which the individual coupling devices are advantageously pivotably arranged. Advantageously the coupling device is structured as a double hinge and thus has two hinge joints.

In a further advantageous embodiment at least one drive element is both a drive element of the first drive and a drive element of the second drive. Thus as stated above it is possible for the two drives to have a common stator or a common rotor.

The design as linear motors, in comparison with solutions of the prior art, offers the advantage that no lubricants need be used and no "fixed" curve tracks or curve discs. Also no running rollers or similar are required so that wear is substantially reduced. Furthermore the embodiments according to the invention allow aseptic applications and also use in wet zones.

In a further advantageous embodiment at least one arm is arranged below the carrier and/or at least one arm above the carrier. Thus it is possible that several or all arms are arranged below the carrier, but it would also be possible for a number of arms to be arranged above the carrier and a further number of arms to be arranged below the carrier. Thus for example it would be possible for every second arm in the peripheral direction of the carrier to be arranged above the carrier and every second arm in the peripheral direction of the carrier to be arranged below the carrier. In this way collisions between the individual arms can be avoided more easily.

Advantageously the individual pivot axes are spaced equally far apart in the peripheral direction of the carrier and preferably also equally far from the carrier axis.

The present invention is furthermore directed at a plant for processing containers which comprises a first processing unit that processes the containers in a first specified manner and which comprises a second processing unit that is arranged after the first processing unit in the transport direction of the containers and processes the containers in a second specified manner. Furthermore a device of the type described above is also provided arranged between the first processing unit and the second processing unit.

In a further advantageous embodiment at least one processing unit is selected from a group of processing units which include heating devices for plastic preforms, forming devices for transforming plastic preforms into plastic containers, sterilisation devices for sterilising plastic preforms or plastic containers, filling devices for filling containers, closing devices for closing containers with closures, labelling devices for labelling containers, transport devices for transporting containers, or similar. Treatment of the containers can take place during their transport or for example during a (partial) stoppage of the transport means or arms.

Thus for example the device according to the invention could be arranged as a transport star between a heating device for heating plastic preforms and a forming unit such as for example a blow-moulding machine, more precisely the blowing wheel of the blow-moulding machine. It would also be possible for the device according to the invention to be arranged between a blowing wheel and a subsequent star or air transporter. In a further advantageous embodiment the device could also be provided as a pitch-variable transport star in a blocked machine.

In addition it would also be possible for the transport device according to the invention to be located in or with a device for sterilising plastic preforms. It would also be possible for the device according to the invention to perform arbitrary tasks such as division tasks, pitch changes, handling of packaging of all types, receiving and sorting applications (pick and place) and similar. The transport elements according to the invention can be designed both for neck handling i.e. guiding at a bottle neck, and for a base or body handling. In a further advantageous embodiment the arm can be produced as a separate assembly so that it can easily be removed from the respective carrier (for example in the manner of a fast change system).

Furthermore it would be possible for plug connections integral to the arm to be provided to facilitate electrical connection and control. Furthermore a bus system could be provided, wherein it is particularly preferred for the individual components to be addressed independently. In addition it would also be possible for a motor control unit or motor controller to be integrated in the device. It is possible that this control unit moves with the carrier or is arranged stationary. A signal transfer from the control device can for example take place via a slip ring or similar, however a wireless signal transmission would also be conceivable.

The present invention is furthermore directed at a method for transporting containers, wherein the containers are transported along a pre-specified transport path with a multiplicity of transport elements and these transport elements are each arranged on a common carrier, and wherein during transport of the plastic containers the transport elements are swivelled in relation to pre-specified pivot axes by means of a multiplicity of first drive devices controllable independently of each other.

According to the invention the individual transport elements are moved at least part of the time in a straight line in relation to their pivot axes. Therefore also according to the method it is proposed that both swivel movements about pivot axes and linear movements of the individual transport elements are performed. Advantageously said movements are carried out by means of independent drive movements so that the individual transport elements can advantageously be brought into any arbitrary position within a particular radius or circle segment.

BRIEF DESCRIPTION OF THE DRAWINGS

Further advantages and embodiments arise from the enclosed drawings. These show:

FIGS. 9a, 9b two views of a further embodiment of a device according to the invention;

FIGS. 10a, 10b two views of a further embodiment of a device according to the invention;

FIGS. 12a, 12b two further views of the embodiment shown in FIG. 11a of the device according to the invention;

FIGS. 13a, 13b two views of a further embodiment of a device according to the invention.

DETAILED DESCRIPTION OF THE INVENTION

Figure 1:
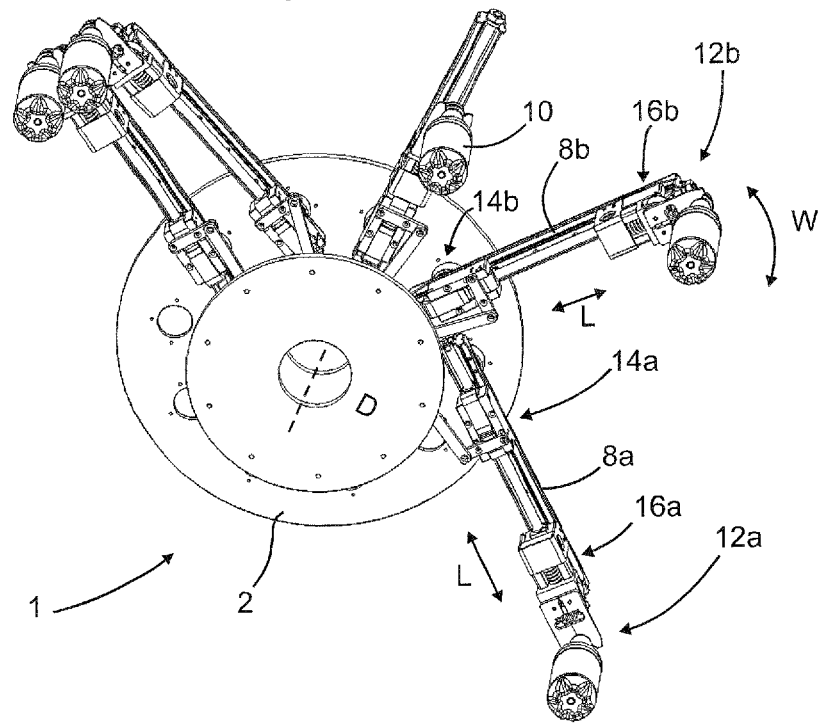
FIG. 1 a part view of a device according to the invention.

FIG. 1 shows a device according to the invention in a first embodiment. A carrier 2 is provided which is rotatable about a geometric rotary axis D. On this carrier is arranged a multiplicity of transport elements 12a, 12b which each serve to transport the containers 10. The individual transport elements 12a, 12b each have arms 8a, 8b which are arranged on the carrier 2 pivotable in relation to individual pivot axes. These individual pivot axes are here parallel to rotary axis D. The individual transport elements 12a, 12b comprise first drive devices 14a, 14b which cause a swivel movement along arrow W in relation to the pivot axis. Furthermore second drives or drive devices 16a, 16b are provided with which the containers can be moved along the linear direction L in relation to the respective pivot axes.

The device 1 allows both the rotary movement of all containers in relation to rotary axis D and a swivel movement in relation to individual pivot axes and a linear movement of the containers in relation to their individual pivot axes.

Figure 2:
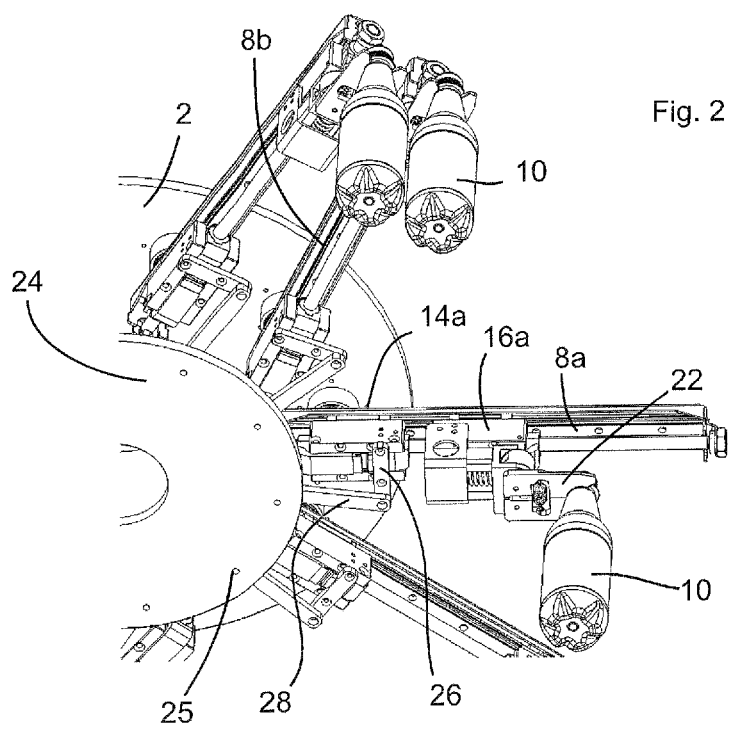
FIG. 2 a part view of the device shown in FIG. 1.

FIG. 2 shows a further detailed depiction of the device shown in FIG. 1. Here again can be seen arms 8a, 8b and containers 10 on each of which are arranged gripper elements 22. Reference numerals 26 and 28 are constituents of a coupling mechanism which also converts a linear movement of a drive device 14a in relation to arm 8a into a swivel movement in relation to the individual pivot axes. Reference numeral 24 designates a fixing element which is here connected rotationally fixed with the carrier 2 and on which the coupling elements 28 are each pivotably hinged. Reference numeral 25 designates as an example one of the said hinge points.

In this way it is possible to achieve a container delivery using a mechanism controlled by linear motors. Thus the guide curves used in the prior art are not required, whereby the new system is more flexible and universally applicable than said systems of the prior art. Correctly designed, the individual pivot arms or extension arms 8a, 8b can run almost wear-free and also lubrication-free.

Advantageously the individual arms in the movement direction W achieve a swivel angle of approximately 150°, preferably around 120°. The stroke achieved by the individual gripper elements 22 is approximately 180 mm, preferably around 140 mm. As stated above, this stroke movement or linear movement and the swivel movement of the individual gripper elements are controllable independently of each other. Furthermore for the materials of the arms and other elements, lightweight materials are used in order to achieve maximum acceleration and/or velocity. As shown in FIG. 2, to achieve the swivel movement i.e. conversion of linear motion into a swivel motion, a lever drive is provided in the manner of a toggle joint. As stated the lever can be secured with its loose end on the carrier or fixing device 24 via a bolt (not shown).

Figure 3:
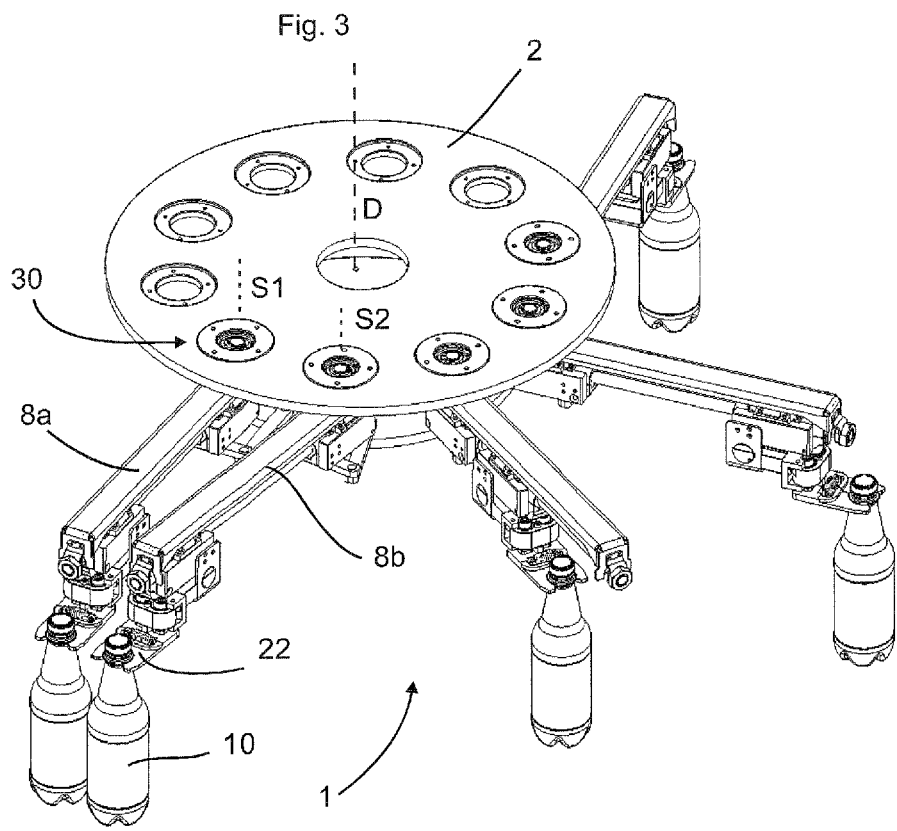
FIG. 3 a further view of a device according to the invention.

FIG. 3 shows a further depiction of a device according to the invention. Here we see the individual (geometric) pivot axes S1 and S2 in relation to which the arms 8a and 8b are arranged swivellably in relation to carrier 2. Here rotary bearings 30 are provided which achieve the pivotable mounting in relation to the carrier 2.

Figure 4:
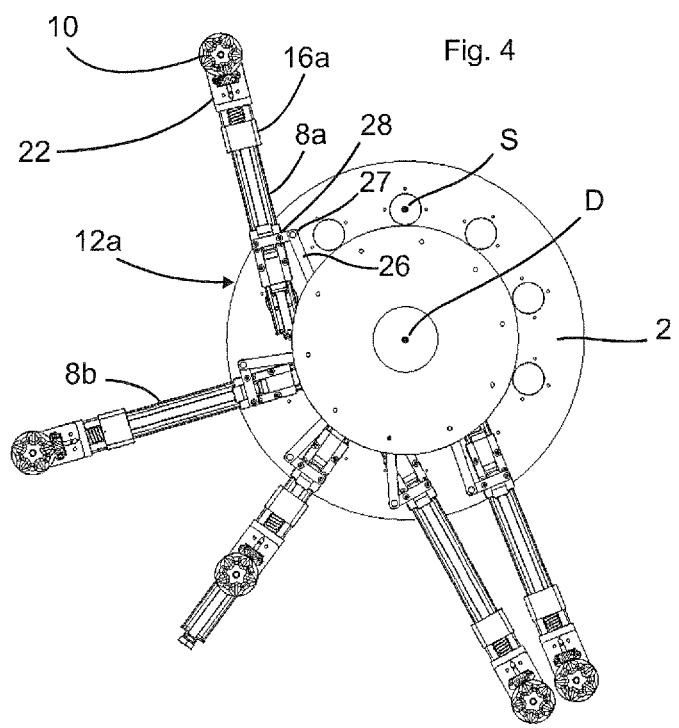
FIG. 4 a view from below onto the device according to the invention.

FIG. 4 shows a view of the device 1 shown in FIG. 3 from below. Here again we see the individual arms 8a, 8b which are arranged on the carrier 2 swivellable in relation to their pivot axes. Reference numeral 27 designates a hinge connection between the lever elements 26 and 28, by means of which a linear movement of the drive device 14a is converted into a swivel movement of the arm.

Figure 5:
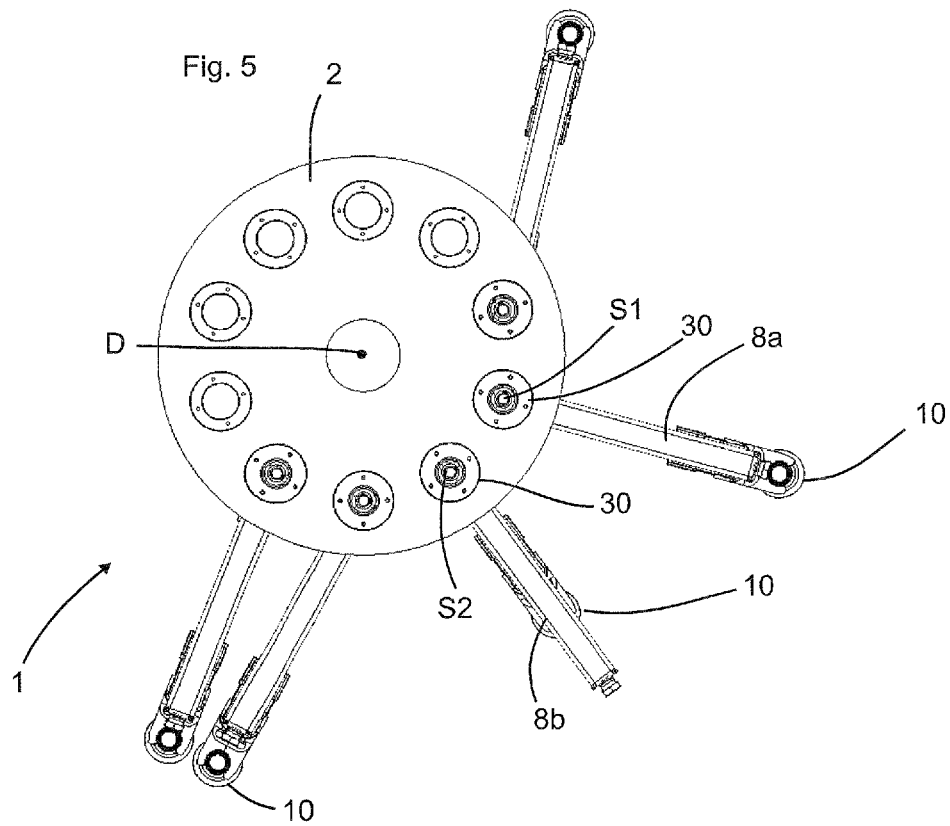
FIG. 5 a further top view onto the device according to the invention.

FIG. 5 shows a further depiction of a device according to the invention wherein here again the individual pivot axes S1 and S2 and the central rotary axis D can be seen and the individual rotary bearings 30 for achieving the swivel movement are also shown. It is clear that the containers 10 here have very high degrees of freedom in relation to their movement. Also in the depiction shown in FIG. 5 it is clear that by the device 1 according to the invention for example a pitch between the individual containers can be reduced or increased.

Figure 6:
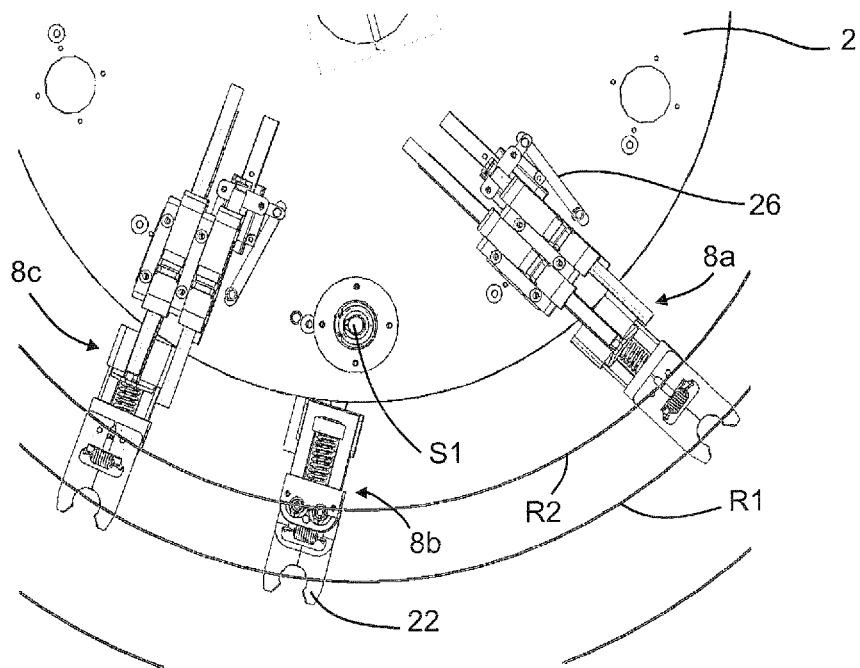
FIG. 6 a part view of a further embodiment of a device according to the invention.

FIG. 6 shows a further embodiment of a device according to the invention. In this embodiment some arms 8a, 8c are arranged below the carrier 2 and further arms 8b above the carrier. In other words here the extension arms or pivot arms are arranged in different planes. Here the gripper elements 22 can also be placed so that as a whole they can again transport the containers at the same height. Thus for example at some of the pivot arms, spacers can be provided which cause the individual gripper elements as a whole to lie at the same height. With this embodiment it is possible to place the individual arms closer together without them colliding, since only every second arm is arranged on one side of the carrier. Advantageously in this embodiment some arms are thus arranged below the carrier and some arms above the carrier.

Figure 7A:
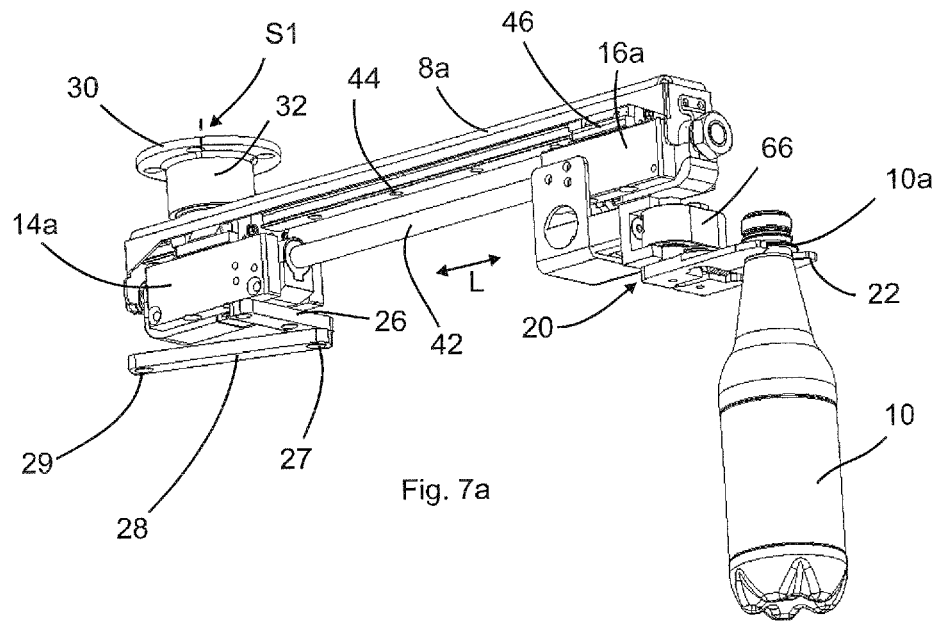
FIGS. 7a-7c three views of an arm for a device according to the invention.
Figure 7B:
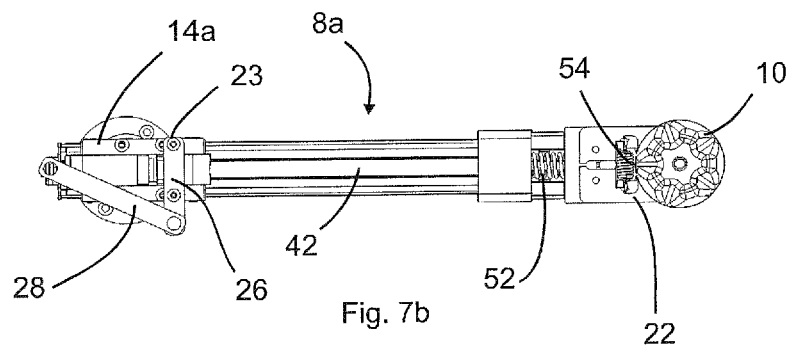
Figure 7C:
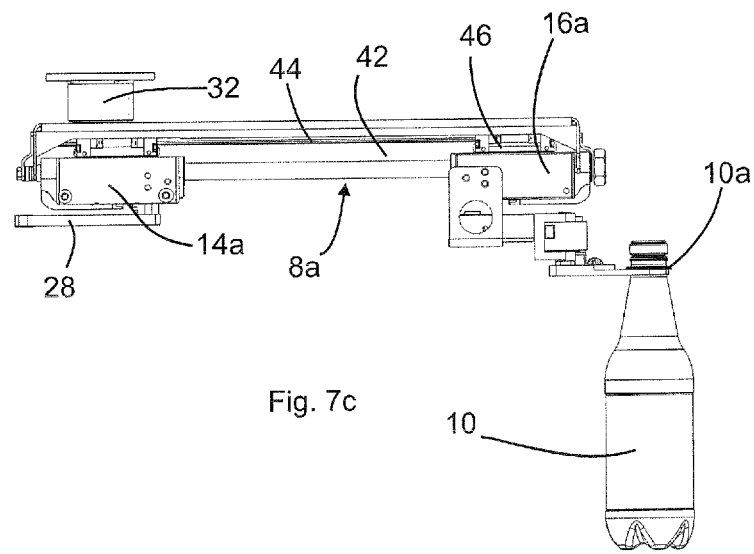

FIGS. 7a-7c show a first depiction of an arm according to the invention including the drives. Reference numeral 30 again refers to a rotary bearing which serves to execute the swivel movement of the arm 8a in relation to pivot axis S1. The container 10 is here arranged on a gripper element 22, wherein this gripper element 22 more precisely grips the container 10 below its carrier ring 10a. Reference numeral 20 designates as a whole the holding mechanism for holding the container, wherein this holding mechanism 20 (in particular with gripper element) is advantageously arranged removably on a carrier 66. Reference numeral 16a designates a second drive device which serves to execute the stroke movement of the gripper element 22. This drive device 16a can here be designed as a stator of a linear motor which is arranged displaceable in direction L in relation to a rotor 42. Reference numeral 44 refers to a guide rail which serves to hold a slide 46. The term rotor is used below for the rod-like body and the term stator for the elements mobile in relation to this rod-like element. However in principle other definitions of rotor and stator are also conceivable.

Reference numeral 14a designates a first drive device which serves to execute the swivel movement. The first drive device 14a is also formed as a stator which is mobile in relation to the rotor 42. Here the rotor 42 serves both as a linear motor drive element to execute the stroke movement and also to execute the swivel movement. The linear movement of the drive device 14a is converted into a swivel movement via rods 26 and 28 which are pivotably connected together via a hinge 27. For this the rod 28 is arranged pivotable on the carrier or the fixing device (not shown). In the case of a linear movement of drive device 14a, the angles between the individual rods 26 and 28 and also the swivel position of the pivot element 28 in relation to the carrier are changed, and thus the angle of the arm 8a in relation to pivot axis S1 is also changed.

FIG. 7b shows a further depiction of the device shown in FIG. 7a. Here again the two rods 26 and 28 can be seen wherein the rod 26 is rigidly connected with drive device 14a via connecting devices (such as bolts) 23. Reference numeral 52 designates a spring element which can damp out the reaching of the end position of the clamping element 22. Reference numeral 54 designates a further spring element which holds the gripper element 22 together so that a container can be delivered to the gripper element 22 against the resistance of this spring element.

FIG. 7c shows a further depiction of the transport arm. Here again guide rail 44 can be seen which serves to guide the slide 46. Again hinge 30 is visible.

If in the device shown in FIGS. 7a to 7c the second drive device 16a runs beyond the rotor 42, a linear shift movement occurs. The gripper device 22 is also attached to this drive device 16a. If the first drive device 14a also moves beyond the rotor 42, via the lever linkage 26 and 28 a rotary motion occurs which as stated above is made possible by the rotary bearing 30. As will be shown below, many different combinations with one or more rotors or one or more stators are conceivable. Also it is conceivable to move the stator or rotor, wherein a second stator executes a movement relative thereto (wherein this relative movement can be converted into a rotary motion or a thrust motion).

Figure 8A:
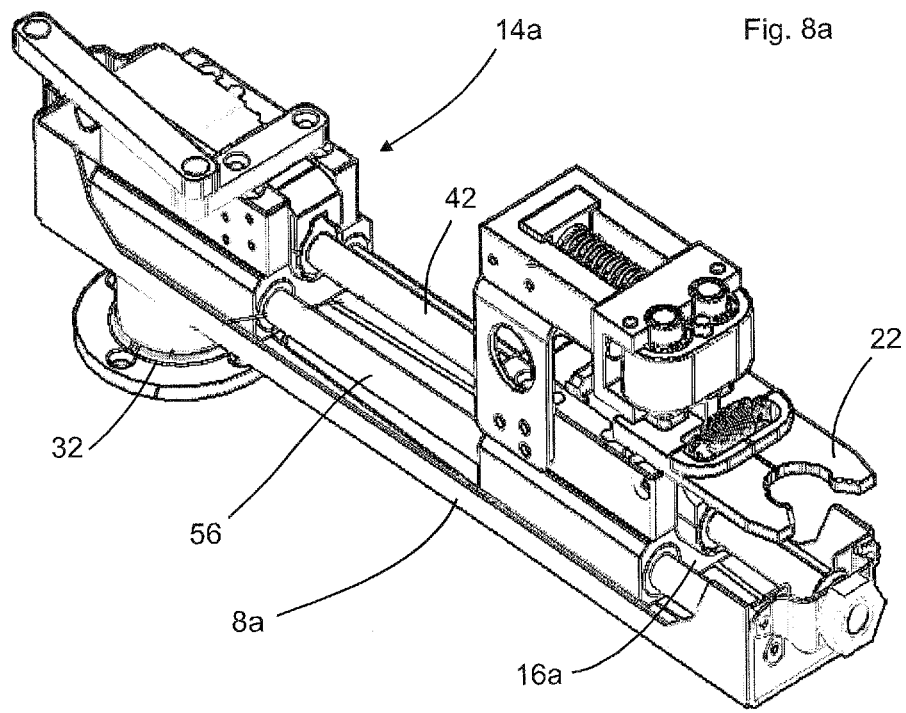
FIGS. 8a, 8b two views of a further embodiment of a device according to the invention.
Figure 8B:
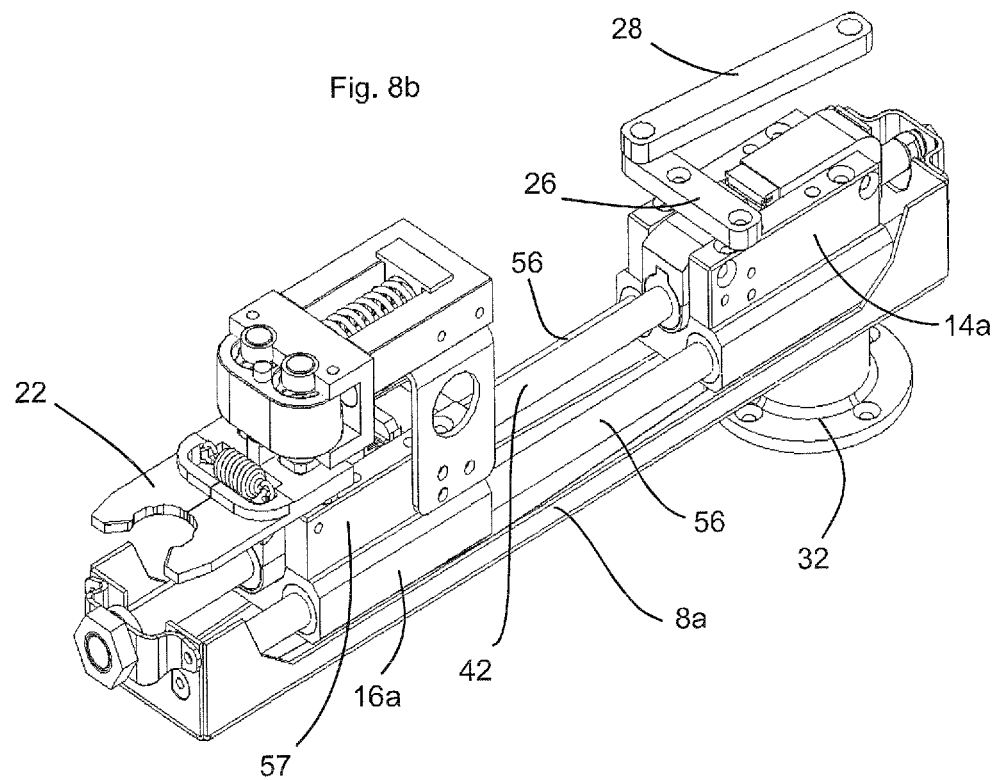

FIGS. 8a and 8b show a further embodiment wherein here again two stators or drive devices are arranged on a rotor 42. The advantages of such an arrangement of several stators on a rotor are a comparatively narrow construction form of the entire arm or extension arm, and the cost benefit as only one rotor is required. In this embodiment the rotor 42 is fixedly arranged i.e. fixed in relation to the pivot axis, and the two rotors or drive devices 14a, 16a are arranged mobile. Reference numeral 56 designates a guide rod which here serves to guide the drive device 16a. Here too a coupling device is provided which converts the linear motion of the first drive device 14a into a swivel motion in relation to the pivot axis.

FIG. 8b shows a further view from below of the embodiment shown in FIG. 8a. Here again the gripper element 22 can be seen and also the rotor 42 and two guide rods 56 which serve to guide a slide 57. In this way a relatively simple and rigid construction can be achieved wherein preferably the two guide rods 56 are designed as round guide rods with recirculating ball sockets. As stated, in this embodiment only one rotor is required. However it is relatively long in the design shown in FIGS. 8a and 8b as the stroke movement and swivel movement run on one shaft and are arranged in succession.

FIGS. 9a and 9b show a further embodiment which serves to reduce the length. To prevent a collision of the base plate for example with a blow moulding, the structure of the swivel arm has been modified slightly here wherein the guide rods have been replaced by a linear guide 45. In addition the rotary point for the swivel motion has been placed precisely on the stator 16a. Stator 16a is thus in this embodiment not mobile linear in relation to the pivot axis. In this embodiment the drive device 16a or stator moves the rotor 42 on which the clamp 22 is attached. In this case the pivot stator or first drive device 14a, depending on the pivot angle required, reacts to the moving rotor 42 with a relative movement. If for example no change in pivot angle is desired, the first drive device 14a must be moved with the same speed i.e. over the same distance in relation to rotor 42 as a second drive device 16a. In this way again both movements can be achieved on one rotor.

It is evident that in the embodiments shown in FIGS. 9a and 9b, the first drive device 14a is arranged once between the gripper device 22 and pivot axis, and once (see FIG. 9a) on the opposite side. In principle thus the first drive device 14a which causes the swivel movement in relation to the pivot axis can be arranged at different positions in relation to the pivot axis firstly and the gripper element 22 secondly. Here again can be seen the coupling elements or rods 26 and 28 which are connected together via a hinge 27.

The advantage of this embodiment lies in the relatively simple and rigid construction as only one rotor is required. The risk of collision with blow mouldings can also be prevented. However a relatively complex controller is required here because of the relative movement.

FIGS. 10 and 10b show further embodiments of a device according to the invention. In this embodiment two stators and two rotors are provided. This embodiment may be suitable above all if, because of space problems, the version with just one rotor with a small reference circle cannot be used. With larger reference circles, in some cases there is sufficient space for large swivel angles. Reference numeral 44 here again designates a rotor which serves to execute the lever movement. This rotor 44 here moves a carrier 49 on which are arranged the pivot rods 26, 28. Thus the swivel movement of the arm 8a is achieved. Reference numeral 42 here designates the rotor for executing the stroke movement. Reference numeral 16a (FIG. 10b) correspondingly identifies the first drive device which serves to execute the stroke movement.

The second device 16a is here again firmly arranged in relation to the pivot axis. The first drive device 14a is here also firmly arranged in relation to the pivot axis, wherein here the two rotors 42 and 44 formed as rods are each moved in order to execute the swivel and stroke movements. In this embodiment it is possible to reduce the length of the arm as a whole to avoid collisions in the region of the large swivel angle. For the swivel movement again the lever principle described above is used. In this way there are several possibilities of arranging the linear motors.

To achieve a flat construction, the two linear motors 16a and 14a were placed flat on the motor flange. This gives the diagonal arrangement of the two rotors 42 or 44 or guide rods shown in FIGS. 10a and 10b. Thus a compact construction is achieved, however the power supply is relatively complex. Furthermore here additional ball sockets are required for the rotor movement and the construction form as a whole is relatively long.

Figure 11A:
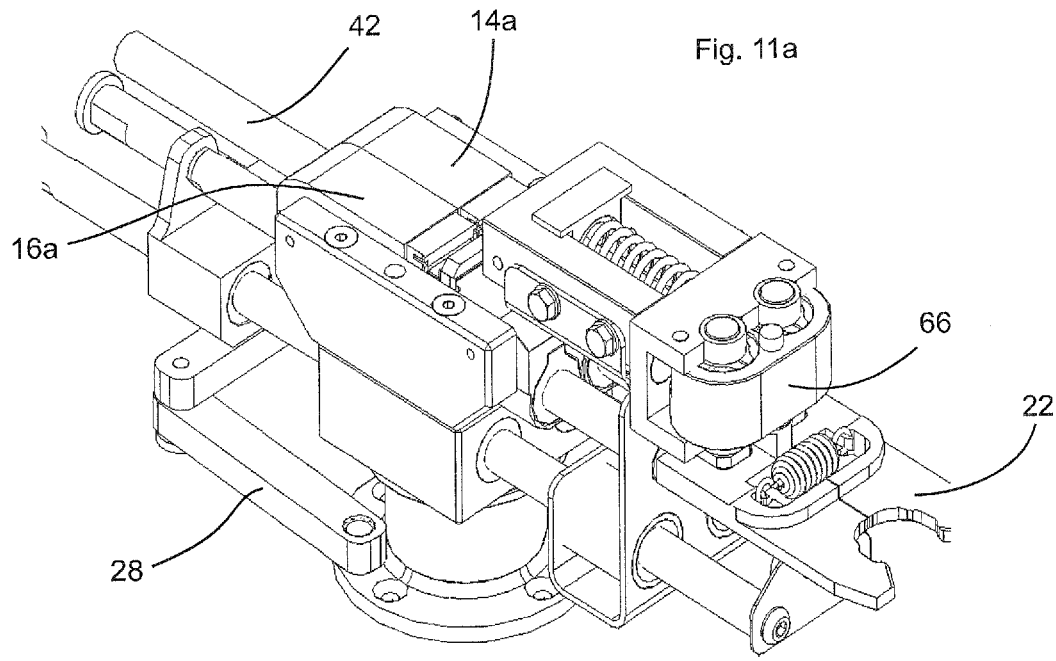
FIGS. 11a, 11b two further views of a device according to the invention in a further embodiment.
Figure 11B:
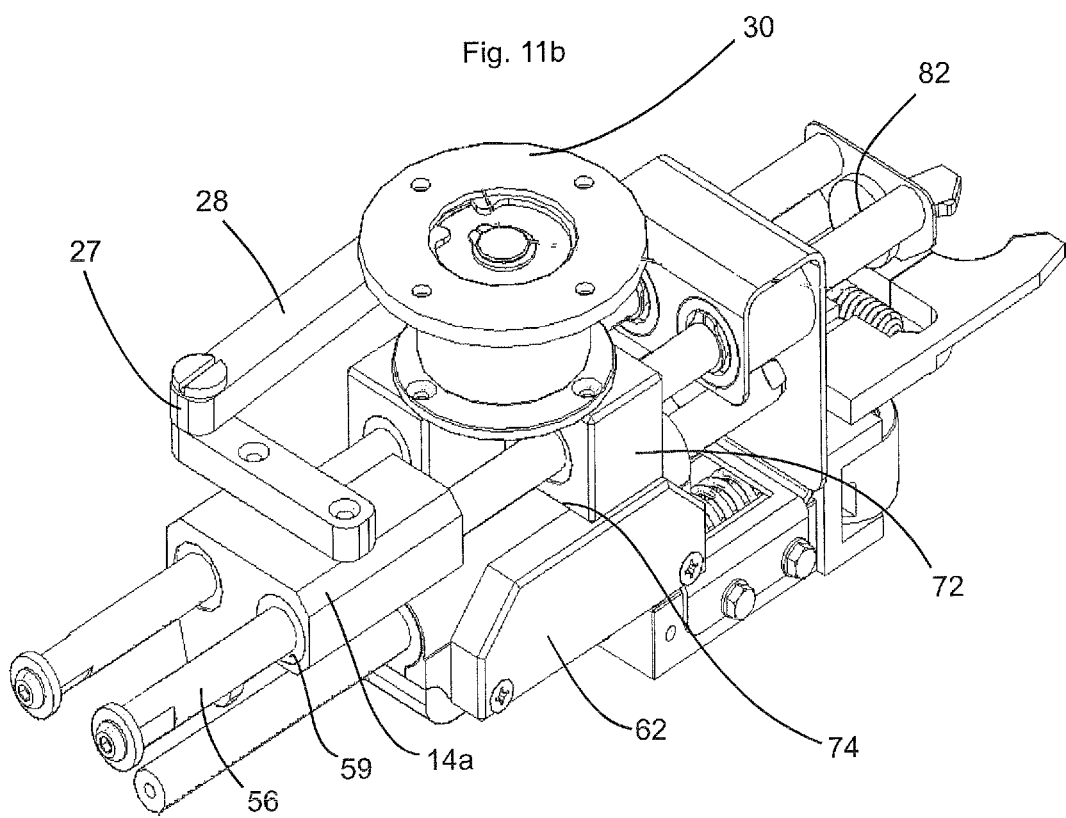

FIGS. 11a and 11b show a further embodiment with two stators and two rotors. In this embodiment the stators 14a for executing the swivel movement and stator 16a for executing the stroke movement are arranged parallel to each other. The advantage of this embodiment lies in the simplicity of the components and a relatively space-saving construction. Advantageously in this embodiment the base plate 72, which is arranged at the hinge 30, is fitted with a recess 74 to hold the first drive device 14a for executing the swivel movement. In this way it is possible to hold at least three ball sockets per plate, which again improves the running behaviour.

Furthermore in this embodiment a drag guide is provided. On extension of the first drive device 14a, the guide rods 56 are carried via a securing plate 59 and returned to the rest position again via magnets 82. This gives a space advantage in relation to other variants. Reference numeral 66 again designates the carrier for holding the clamp device 22. Reference numeral 62 designates as a whole the motor flange which carries the two linear motors.

FIGS. 12a and 12b show further depictions of the embodiment shown in FIGS. 11a and 11b. Here can also be seen the magnets 82 which as stated above serve to return the guide rods 56. Furthermore reference numeral 80 relates to a clamp holder with a ball socket and reference numeral 86 to a rear stop of the guide rod 56. This embodiment offers the advantage of a very compact construction and good running properties of the rotor due to the better guidance. This form also allows good possibilities for connecting the motors.

FIGS. 13a and 13b show a further embodiment of a device according to the invention. Here again two linear motors are arranged parallel to each other, wherein however a guide rail 94 is also provided to guide the swivel movement. The benefit of this embodiment lies in the greater rigidity of the guide rail 94 and the ease of assembly, since this system can be provided as a pre-assembled complete system. Reference numeral 92 here designates a slide on which are again arranged rods 26 and 28.

This embodiment offers the advantage of a compact and rigid design and furthermore consists largely of standard parts. However the use of linear guides is more costly than the use of ball sockets.

Figure 14A:
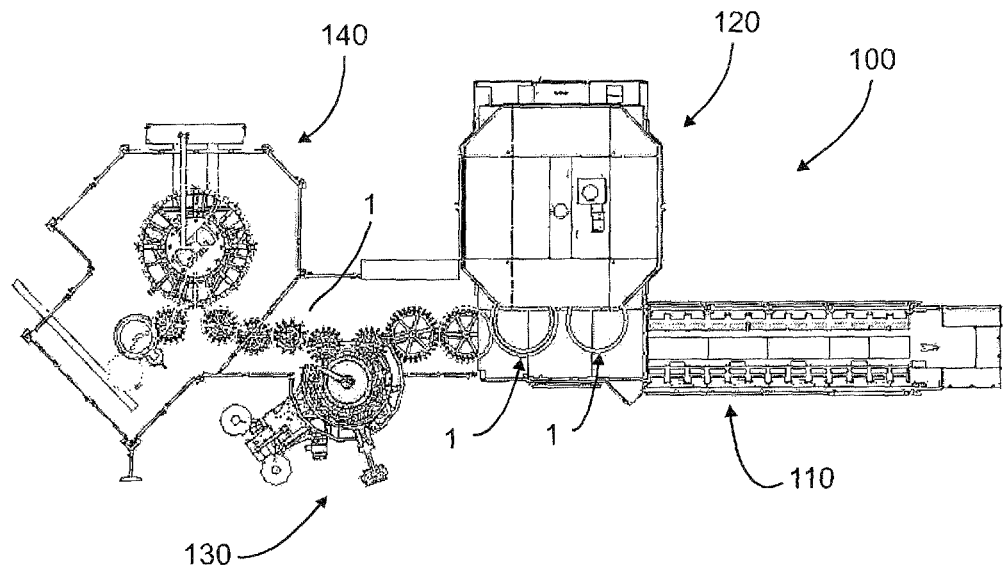
FIGS. 14a, 14b two views of a plant with devices according to the invention.
Figure 14B:
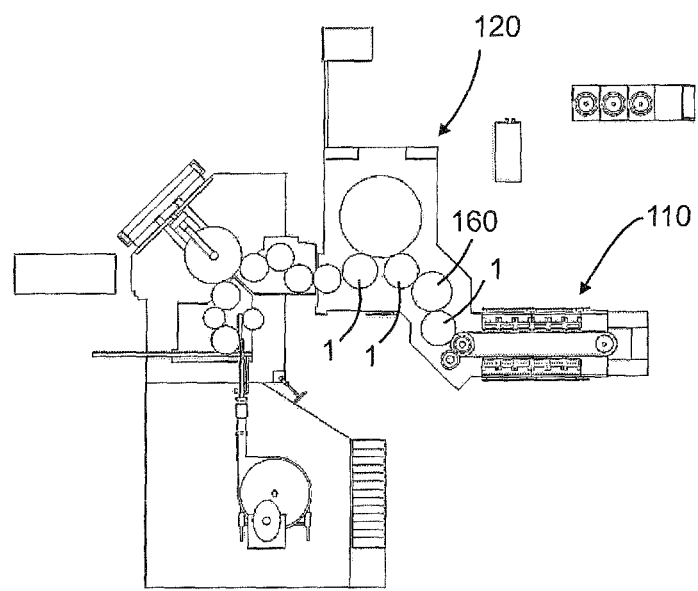

FIGS. 14a and 14b show two examples of plants according to the invention for processing containers. These plants each have a heating device 110 for heating plastic preforms. Connected to these are forming devices 120 for transforming plastic preforms into plastic containers, and after these come a labelling device 130 for labelling containers and a filling device 140 for filling containers. Reference numerals 1 refer to positions at which the devices according to the invention for transporting containers can be arranged. For the plant shown in FIG. 14a, the devices 1 can for example be provided as servo stars to feed the plastic preforms to the blow-moulding machine 120 and to discharge the plastic containers from the blow-moulding machine 120. Also a device 1 according to the invention can be provided to adapt or change a pitch between a labelling machine 130 and the filling machine 140.

In the embodiment shown in FIG. 14b, the devices according to the invention are again used as servo stars 1 or also as transport devices which transport the plastic preforms from the heating device 110 to a sterilising device 160.

The applicant reserves the right to claim all features disclosed in the application documents as essential to the invention where novel individually or in combination in relation to the prior art.

REFERENCE NUMERAL LIST

1 Device
2 Carrier
8a, 8b, 8c Arms
10 Containers
10a Carrier ring
12, 12b Transport elements
14a, 14b First drive devices
16a, 16b Second drive devices
20 Holding mechanism
22 Gripper element, clamping element
23 Connecting device
24 Fixing element
25 Hinge point
26 Components of a coupling mechanism, lever element, rods
27 Hinge
28 Components of a coupling mechanism, rods
30 Rotary bearing, hinge
42 Rotor
44 Guide rail, rod
45 Linear guide
46 Slide
49 Carrier
52 Spring element
54 Spring element
56 Guide rod
57 Slide
59 Securing plate
62 Motor flange
66 Carrier, clamp holder
72 Base plate
74 Recess
80 Clamp holder
82 Magnet
86 Rear stop of guide rod
92 Slide
94 Guide rail
110 Heating device
120 Blow-moulding machine
130 Labelling device
140 Filling device
160 Sterilisation device
D Rotary axis
L Direction
S, S1, S2 Pivot axes
W Arrow (swivel movement)

The invention claimed is:

1. A device for transporting containers and in particular plastic containers with a main carrier rotatable about a pre-specified main axis (D), with a multiplicity of transport elements for transporting the plastic containers, wherein each of these transport elements is arranged on an arm and swivelable in relation to the main carrier about a pre-specified geometric pivot axis (S1, S2), and a multiplicity of independently controllable first drive devices is provided to generate swivel movements of the transport elements, wherein each transport element is also mobile linear in relation to the pivot axis (S1, S2) about which it is swivelable, and a multiplicity of independently controllable second drive devices is provided to generate linear movement of the transport elements, wherein the first drive devices and the second drive devices are independently controllable electric motor drives, whereupon linear movement and swivel movement of the transport elements are controllable independently of each other.

2. The device according to claim 1, wherein at least one first drive device has a linearly mobile drive element, the linear motion of which is converted into the swivel motion of the transport element.

3. The device according to claim 2, wherein a coupling device is provided for converting the linear motion of the drive element into the swivel motion of the transport element.

4. The device according claim 1, wherein at least one drive device element is both a drive element of a first drive and a drive element of a second drive device.

5. The device according to claim 1, wherein at least one arm is arranged below the carrier and at least one arm above the carrier.

6. A plant for processing containers with a first processing unit which processes the containers in a first pre-specified manner and with a second processing unit which is arranged after the first processing unit in a transport direction of the containers and which processes the containers in a second pre-specified manner, and having a device according to claim 1 arranged between the first processing unit and the second processing unit.

7. The plant according to claim 6, wherein at least one processing unit is selected from a group of processing units which comprises a heating device for plastic preforms, a forming device for transforming plastic preforms into plastic containers, a sterilisation device for sterilising plastic preforms or plastic containers, a filling device for filling containers, a closing device for closing containers with closures, a labelling device for labelling containers, and a transport device for transporting containers.

8. A method for transporting containers, wherein the containers are transported along a pre-specified transport path with a multiplicity of transport elements and these transport elements are each arranged on a common rotatable carrier, wherein during transport of the plastic containers the transport elements are swivelled each in relation to pre-specified pivot axes (S1, S2) by a multiplicity of independently controllable first drive devices, and wherein the individual transport elements at least part of the time are moved in a straight line in relation to their pivot axes (S1, S2), and a multiplicity of independently controllable second drives is provided to generate the linear movement of the transport elements, wherein the first drive devices and the second drive devices are independently controllable electric motor drives, whereupon linear movement and swivel movement of the transport elements are controllable independently of each other.

9. The device according to claim 1, wherein the first drive devices are linear electric motors.

10. The device according to claim 1, wherein the second drive devices are linear electric motors.

11. The device according to claim 1, wherein the first drive devices and the second drive devices have a common stator or a common rotor.

12. The device according to claim 11, wherein the first drive devices and the second drive devices have a common rotor rod.

13. The drive device according to claim 5, wherein every second arm in a peripheral direction of the carrier is arranged above the carrier and every second arm is arranged below the carrier.

14. The device according to claim 1, wherein swivel of the transport elements in relation to the main carrier is achieved by a lever drive which converts a linear motion into a swivel motion.

15. The device according to claim 14, wherein the lever drive is a toggle joint.

\* \* \* \* \*